United States Patent
Mori et al.

(10) Patent No.: US 8,874,322 B2
(45) Date of Patent: Oct. 28, 2014

(54) VEHICLE STEERING CONTROLLER

(71) Applicant: Honda Motor Co., Ltd., Tokyo (JP)

(72) Inventors: Naoki Mori, Wako (JP); Tatsuya Ishikawa, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 14/177,401

(22) Filed: Feb. 11, 2014

(65) Prior Publication Data

US 2014/0229073 A1   Aug. 14, 2014

(30) Foreign Application Priority Data

Feb. 14, 2013   (JP) ................................ 2013-027070
Mar. 14, 2013   (JP) ................................ 2013-052300

(51) Int. Cl.
  *B62D 6/00* (2006.01)
  *B62D 15/02* (2006.01)

(52) U.S. Cl.
  CPC .................................... *B62D 15/025* (2013.01)
  USPC ................. 701/42; 701/36; 701/41; 180/204; 180/421

(58) Field of Classification Search
  None
  See application file for complete search history.

(56) References Cited

U.S. PATENT DOCUMENTS

| | | | | |
|---|---|---|---|---|
| 6,308,123 B1* | 10/2001 | Ikegaya et al. | ................. | 701/41 |
| 6,489,887 B2* | 12/2002 | Satoh et al. | ................. | 340/436 |
| 6,792,345 B2* | 9/2004 | Matsumoto et al. | ............ | 701/96 |
| 7,216,023 B2* | 5/2007 | Akita | ............................. | 701/41 |
| 7,510,038 B2* | 3/2009 | Kaufmann et al. | ........... | 180/169 |
| 7,711,464 B2* | 5/2010 | Kaufmann | ....................... | 701/41 |
| 8,583,366 B2* | 11/2013 | Iida | ................................ | 701/450 |
| 8,594,919 B2* | 11/2013 | Munakata | ...................... | 701/300 |
| 8,694,236 B2* | 4/2014 | Takagi | .......................... | 701/300 |
| 8,738,234 B2* | 5/2014 | Irie et al. | ......................... | 701/48 |
| 2001/0018641 A1* | 8/2001 | Kodaka et al. | ................ | 701/301 |
| 2002/0007239 A1* | 1/2002 | Matsumoto et al. | ............ | 701/41 |
| 2005/0113999 A1* | 5/2005 | Tange et al. | ..................... | 701/41 |
| 2008/0278349 A1* | 11/2008 | Kataoka et al. | ............... | 340/933 |
| 2010/0250064 A1* | 9/2010 | Ota et al. | ........................ | 701/36 |
| 2011/0178689 A1* | 7/2011 | Yasui et al. | ..................... | 701/70 |
| 2012/0150411 A1* | 6/2012 | Oosawa et al. | ................. | 701/96 |
| 2012/0206708 A1* | 8/2012 | Roelke et al. | ................ | 356/4.01 |
| 2012/0209489 A1* | 8/2012 | Saito et al. | ....................... | 701/70 |
| 2013/0006473 A1* | 1/2013 | Buerkle et al. | ................. | 701/41 |
| 2014/0012469 A1* | 1/2014 | Kunihiro et al. | ................ | 701/41 |
| 2014/0032051 A1* | 1/2014 | Ezoe | .............................. | 701/42 |

FOREIGN PATENT DOCUMENTS

JP   2006-15996 A   1/2006

* cited by examiner

*Primary Examiner* — Jonathan M. Dager
(74) *Attorney, Agent, or Firm* — Westerman, Hattori, Daniels & Adrian, LLP

(57) ABSTRACT

A vehicle steering controller includes a shape recognizer that recognizes a shape of a road on the basis of a captured image, a steering control unit that controls steering of a vehicle on the basis of the shape of the road recognized by the shape recognizer, and a determiner that determines whether or not the shape of the road recognized by the shape recognizer is that of a transitional section between a curved road section and a linear road section. If the determination made by the determiner is negative, then the shape recognizer recognizes the shape of the road by performing an approximation using an approximation expression having a degree of one or two, otherwise the shape recognizer recognizes the shape of the road by performing an approximation using an approximation expression having a degree of three.

8 Claims, 9 Drawing Sheets

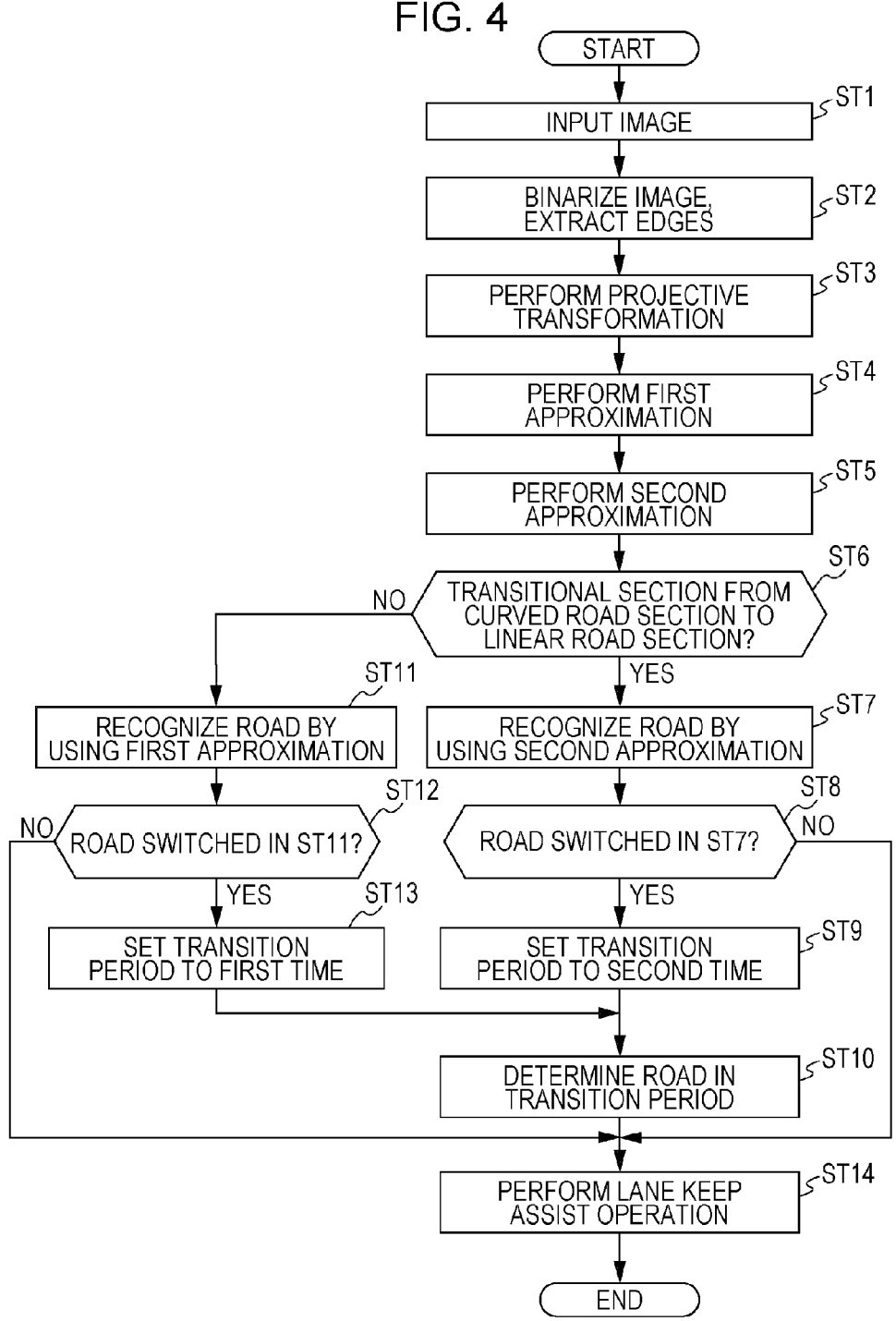

VEHICLE STEERING CONTROLLER

CROSS REFERENCES TO RELATED APPLICATIONS

The present application claims priority under 35 U.S.C. §119 to Japanese Patent Applications Nos. 2013-027070 and 2013-052300, filed Feb. 14, 2013 and Mar. 14, 2013, respectively both entitled "Vehicle Steering Controller." The contents of the applications are incorporated herein by reference in their entirety.

TECHNICAL FIELD

The present disclosure relates to a steering controller that controls steering of a vehicle.

BACKGROUND

A steering controller is known that recognizes the shape (such as the curvature) of a road along which a vehicle is driving on the basis of a captured image of a view ahead of the vehicle, calculates the drift and the deflection angle of the vehicle with respect to the shape of the road that is recognized, and controls steering of the vehicle on the basis of the drift and the deflection angle (see, for example, Japanese Unexamined Patent Application Publication No. 2006-15996).

It is required that the steering controller described in Japanese Unexamined Patent Application Publication No. 2006-15996 more appropriately recognize the shape of a road when the vehicle is driving along a road whose shape changes considerably, such as a transitional section between a curved road section and a linear road section, so that the steering controller can appropriately control steering of the vehicle. In particular, it is required that the steering controller more appropriately recognize the shape of a road when the vehicle is driving along a road that suddenly changes from a curved road section to a linear road section and vice versa (that is, a road whose curvature suddenly changes).

SUMMARY

The present application describes a steering controller that can appropriately recognize the shape of a road and steer the vehicle even when the vehicle is driving along a transitional section between a curved road section and a linear road section.

According to an aspect of the present disclosure, a vehicle steering controller includes a camera that captures an image of a view in a direction in which a vehicle is driving, a shape recognizer that is configured to recognize a shape of a road along which the vehicle is driving on the basis of the image captured by the camera by performing a first approximation that is an approximation using a monomial or a polynomial having a degree of one or two, a steering control unit that is configured to control steering of the vehicle on the basis of the shape of the road recognized by the shape recognizer, and a determiner that is configured to determine whether or not the shape of the road recognized by the shape recognizer is that of a transitional section between a curved road section and a linear road section. The shape recognizer recognizes the shape of the road by performing a second approximation that is an approximation using a monomial or a polynomial having a degree of three or higher in a case where a determination made by the determiner is affirmative.

With the aspect of the present disclosure, in a case where the determination made by the determiner is negative, that is, when the vehicle is driving along a road whose shape changes slightly, such as a linear road section or a curved road section having a constant curvature, the vehicle steering controller can approximate the shape of the road by performing the first approximation with a light calculation load while maintaining a required accuracy. Moreover, in a case where the determination made by the determiner is affirmative, that is, when the vehicle is driving along a road whose shape changes considerably, such as a transitional section between a curved road section and a linear road section, the vehicle steering controller can approximate the shape of the road by performing the second approximation, whose approximation performance is higher than that of the first approximation, while suppressing decrease in the approximation accuracy. Accordingly, even when the vehicle is driving along a transitional section between a curved road section and a linear road section (in particular, when the vehicle is driving along a road that suddenly changes from a curved road section to a linear road section and vice versa), the vehicle steering controller can appropriately recognize the shape of the road and steer the vehicle.

It is preferable that the second approximation be an approximation using a monomial or a polynomial having a degree of three.

The lower the degree of a monomial or a polynomial used to approximate the shape of a road, the lighter the calculation load for performing the approximation. Therefore, performing the approximation by using a monomial or a polynomial having a degree of three has the following advantages: the shape of a transitional section between a curved road section and a linear road section can be approximated more accurately than in a case where the approximation is performed by using a monomial or a polynomial having a degree of two; and a change in the shape of the road can be approximated more rapidly than in a case where the approximation is performed by using a monomial or a polynomial having a degree higher than three.

It is preferable that the determiner make an affirmative determination when the shape of the road recognized by the shape recognizer in the direction in which the vehicle is driving is that of a transitional section from a curved road section to a linear road section.

For a steering controller, it is not preferable that the curvature of a road that is recognized (hereinafter, referred to as the "approximation curvature") be greater than the actual curvature of the road (hereinafter, referred to as the "actual curvature").

If a delay in steering control occurs at the start of a curved road, the driver can appropriately recognize that steering control power is not sufficient, because the vehicle moves outward with respect to the direction in which the road is curved. However, if a delay in steering occurs at the end of a curved road, the vehicle moves inward with respect to the direction in which the road is curved. Therefore, steering is not returned to a central position due to a self-aligning torque after the vehicle has passed the curved road, so that the driver feels an unpleasant sensation.

Accordingly, when the vehicle is driving along a transitional section from a curved road section to a linear road section, it is particularly effective to recognize the shape of the road by performing the second approximation so as to decrease the difference between the actual curvature and the approximation curvature.

It is preferable that, when switching the shape of the road that is used as a recognition result between a first shape and a second shape in accordance with a determination made by the determiner,
the shape recognizer set a transition period and gradually change the shape of the road that is used as the recognition result in the transition period. Here, the first shape is the shape of the road recognized by performing the first approximation and the second shape is the shape of the road recognized by performing the second approximation.

Thus, steering of the vehicle can be gradually changed in accordance with the gradually changing shape of the road that is recognized.

It is preferable that, in a case where the determination made by the determiner changes from negative to affirmative, the shape recognizer gradually change the shape of the road that is used as the recognition result from the first shape before the determination change to the second shape in the transition period; in a case where the determination made by the determiner changes from affirmative to negative, the shape recognizer gradually change the shape of the road that is used as the recognition result from the second shape before the determination change to the first shape in the transition period; and the transition period in which the shape is switched from the first shape to the second shape be set to be shorter than the transition period in which the shape is switched from the second shape to the first shape.

When the determination made by the determiner changes from affirmative to negative, steering of the vehicle can be gradually changed in accordance with the gradually changing shape of the road that is recognized in the transition period that is set to be longer.

On the other hand, when the determination made by the determiner changes from negative to affirmative, that is, when it is necessary to recognize the shape of the road with a higher accuracy, steering of the vehicle can be rapidly changed in accordance with the gradually changing shape of the road that is recognized in the transition period that is set to be shorter. Therefore, the vehicle steering controller can appropriately control steering of the vehicle.

It is preferable that, in a case where the determination made by the determiner is affirmative, the shape recognizer use the shape of the road recognized by performing the second approximation as a recognition result when a direction in which a curved portion of the shape of the road recognized by performing the second approximation is curved is the same as a direction in which a curved portion of the shape of the road recognized by performing the first approximation is curved.

The second approximation, which is performed by using a monomial or a polynomial having a degree higher than that of the first approximation, can more accurately approximate the shape of a road than the first approximation. However, the second approximation is more easily influenced by disturbance than the first approximation. Therefore, whether the second approximation is not influenced by disturbance is detected in accordance with whether or not the directions of the curves of the road obtained by the first and second approximations are the same. Thus, the vehicle steering controller can appropriately steer the vehicle by using the second approximation that is not considerably influenced by disturbance.

BRIEF DESCRIPTION OF THE DRAWINGS

The advantages of the disclosure will become apparent in the following description taken in conjunction with the following drawings.

FIG. 4 is an operational flowchart of the vehicle controller.

DETAILED DESCRIPTION

Figure 1:
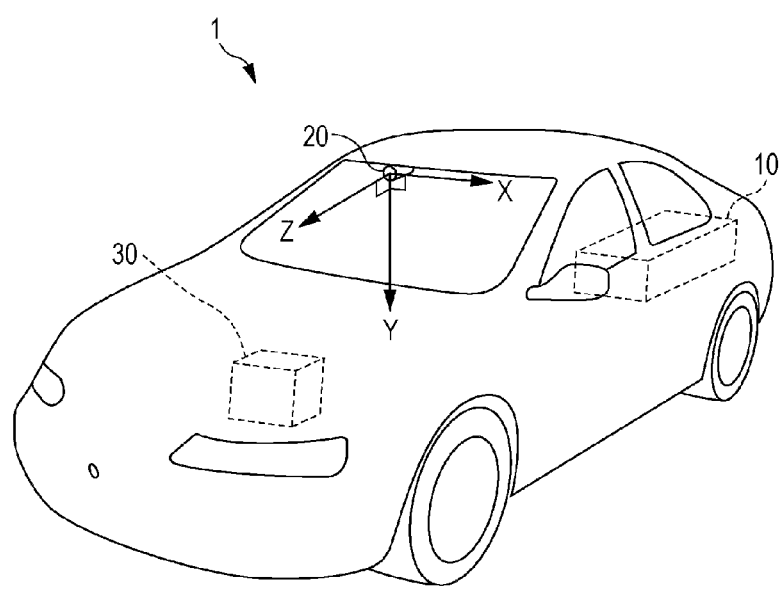
FIG. 1 illustrates a vehicle in which a vehicle controller is mounted.

Hereinafter, a vehicle steering controller according to an embodiment of the present disclosure will be described. Referring to FIG. 1, a vehicle steering controller 10 according to the present embodiment (hereinafter, referred to as a "controller 10") is mounted in a vehicle 1 (the present vehicle) and used. A camera 20, which is mounted in the vehicle 1, captures an image of a road in a direction in which the vehicle 1 is driving (in the present embodiment, in a direction ahead of the vehicle 1). The controller 10 recognizes a state of the road from the image and controls driving of the vehicle 1.

The camera 20 is mounted in the vehicle 1 in such a way that its optical axis extends in the front-back direction of the vehicle 1, so that the camera 20 can capture a front view through the windshield. A three-dimensional coordinate system is defined so that the origin is located at the position of the camera 20, the X-axis extends in the left-right direction (widthwise direction) of the vehicle 1, the Y-axis extends in the up-down direction (vertical direction), and the Z-axis extends in the front-back direction (driving direction).

The vehicle 1 includes a steering apparatus 30 that steers the vehicle 1. The controller 10 controls steering of the vehicle 1 by controlling the steering apparatus 30.

Figure 2:
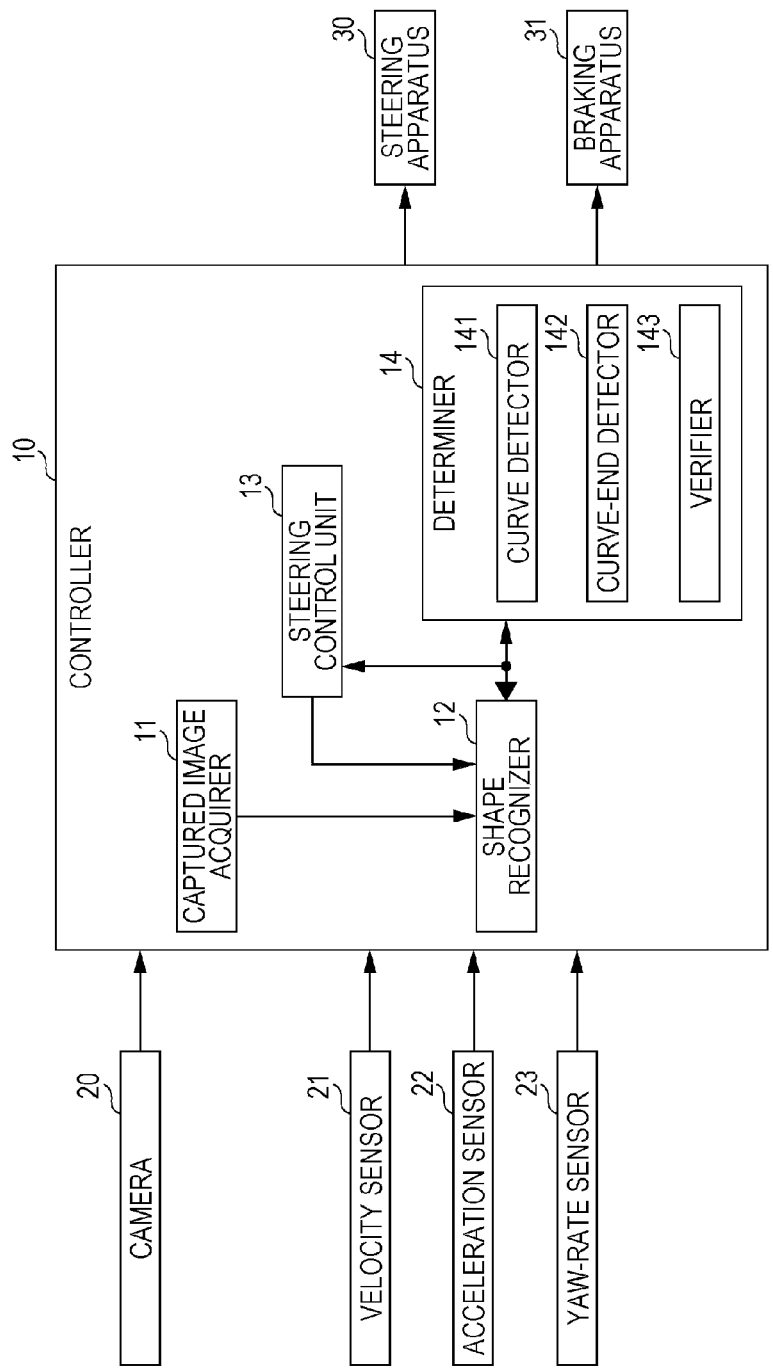
FIG. 2 is a block diagram of the vehicle controller.

Referring to FIG. 2, the vehicle 1 includes a velocity sensor 21, an acceleration sensor 22, a yaw-rate sensor 23, and a braking apparatus 31. The velocity sensor 21 detects the velocity of the vehicle 1 and outputs a velocity detection signal, the acceleration sensor 22 detects the acceleration of the vehicle 1 and outputs an acceleration detection signal, and the yaw-rate sensor 23 detects the yaw rate of the vehicle 1 and outputs a yaw-rate detection signal.

The controller 10 is an electronic unit including a CPU, a memory, and the like. An image signal of the camera 20 and the detection signals of the sensors 21, 22, and 23 are input to the controller 10. The controller 10 recognizes a driving state of the vehicle 1 from these input signals.

The controller 10 functions as an captured image acquirer 11, a shape recognizer 12, a steering control unit 13, and a determiner 14 (including a curve detector 141, a curve-end detector 142, and a verifier 143) by causing the CPU to execute a control program for the vehicle 1, which is stored in the memory. Thus, the controller 10 controls driving of the vehicle by operating one of or both of the steering apparatus 30 and the braking apparatus 31.

In the following description, a state of the vehicle illustrated in FIG. 3 will be used as an example. In this example, the vehicle 1 is driving along a road that changes from a road section 51 that is curved (hereinafter, referred to as a "curved road section 51") to a road section 52 that is linear (hereinafter, referred to as a "linear road section 52"). (In other words, the curvature of the road along which the vehicle 1 is driving changes from a larger curvature to a smaller curvature.) In the example illustrated in FIG. 3, the road suddenly changes from the curved road section 51 to the linear road section 52 (that is, the curvature of the road suddenly changes).

The controller 10 causes the camera 20 to capture an image of a view in the direction in which the vehicle 1 is driving. The controller 10 obtains images of the road sections 5M (M=1 and 2) in front of the vehicle 1 on the basis of the images captured by the camera 20.

The controller 10 detects lane marks 6N (N=1 and 2) of the road sections 5M on the basis of the captured images. The controller 10 controls driving of the vehicle 1 in accordance with information about the detected lane marks 6N.

Referring to the flowchart shown in FIG. 4, a control process performed by the controller 10 to control driving of the vehicle 1 will be described. The controller 10 controls driving of the vehicle 1 by performing the process shown in the flowchart of FIG. 4 at every predetermined control periods (for example, 10 msec).

In the first step ST1 shown in FIG. 4, the controller 10 receives an image signal from the camera 20, coverts the image signal into a digital signal, and stores the digital signal representing an image (grayscale image) captured by the camera 20. The operation of step ST1 is performed by the captured image acquirer 11.

In step ST2, the controller 10 binarizes the image captured by the camera 20, and extracts edges from the binarized image. In step ST3, the controller performs a projective transformation.

Figure 5A:
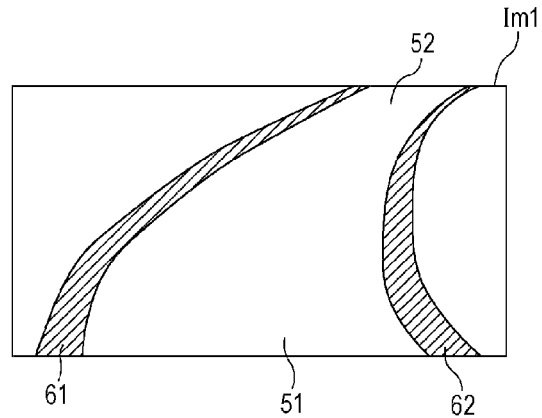
FIG. 5A illustrates an image captured by a camera.
Figure 5B:
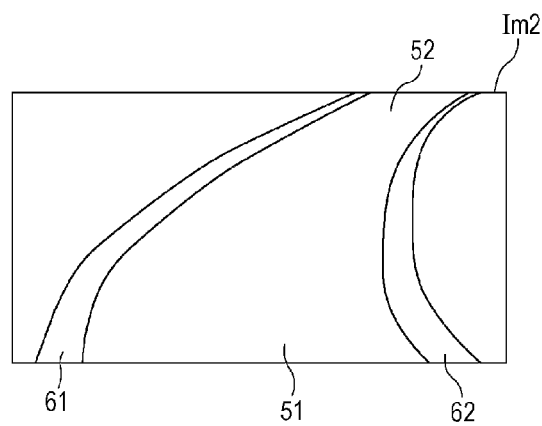
FIG. 5B illustrates edges extracted from the image of FIG. 5A, and FIG. 5C a top view of the image of FIG. 5B.
Figure 5C:
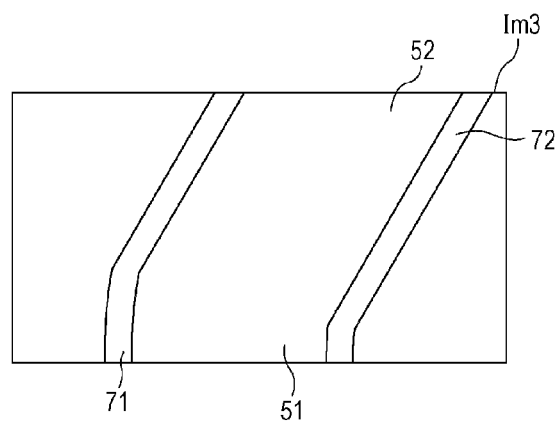

FIGS. 5A to 5C illustrate examples of images obtained by performing the operations of steps ST2 and ST3. FIG. 5A illustrates a captured image Im1 captured by the camera 20 (original image). FIG. 5B illustrates an edge-extraction image Im2 formed by extracting edges from the binarized image formed by binarizing the captured image Im1 by using a predetermined binarizing threshold. FIG. 5C illustrates a top-view image Im3 formed by performing a projective transformation on the image Im2 from a viewpoint above the vehicle 1. In the top-view image Im3, edge lines 7N of the lane marks 6N (N=1 and 2), with respect to the coordinate system as seen from above the vehicle 1, have been extracted.

Figure 6A:
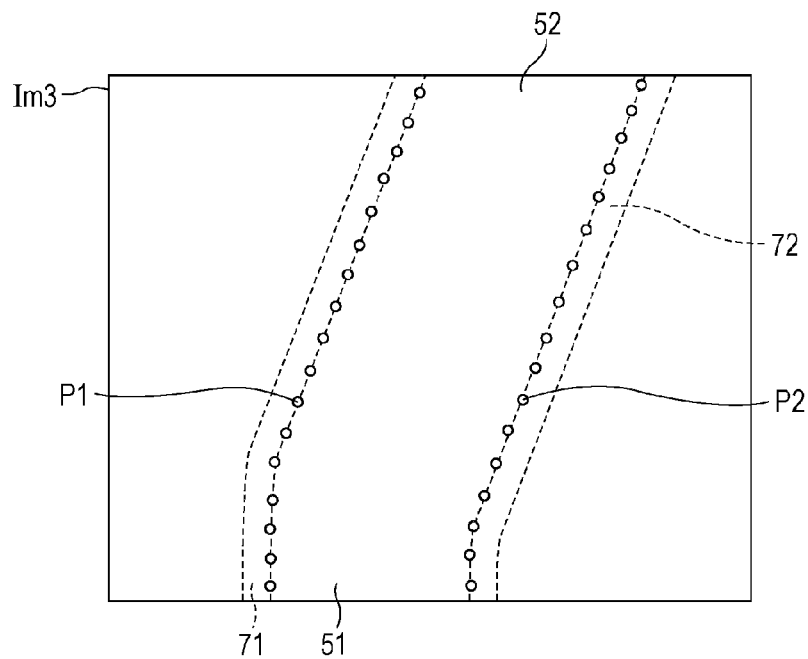
FIG. 6A illustrates approximation points in the top view in which edges of the road have been extracted.

In step ST4, first, the controller 10 samples a plurality of points PN (hereinafter, referred to as "approximation points PN") (N=1 and 2), which are arranged at a predetermined pitch, from the edge lines 7N of the top-view image (see FIG. 6A).

Then, the controller 10 approximates the edge lines 7N by using the sampled approximation points PN (hereinafter, the approximation performed in step ST4 will be referred to as a "first approximation").

To be specific, the first approximation approximates the shape of the road section 5M along which the vehicle 1 is driving by using a monomial or a polynomial having a degree of one or two (hereinafter, "a monomial or a polynomial" will be collectively referred to as an "approximation expression"). (See alternate long and short dash lines 8N (N=1 and 2) in FIG. 6B. Hereinafter, a line obtained by performing the first approximation will be referred to as a "first approximation line").

First approximation lines 81 and 82 are respectively obtained by using approximation points P1 and P2 extracted from images of the lane marks 61 and 62 at both ends (the left end right ends) of the curved road section 51 and the linear road section 52. The first approximation lines 81 and 82 are quadratic curves (lines obtained by using an approximation expression having a degree of two).

The controller 10 basically recognizes an approximation line 8LC (hereinafter, referred to as a "first center line 8LC") (L=1) that passes through midpoints between the first approximation lines 8N (the first approximation line 81 at the left end and the first approximation line 82 at the right end), which have been obtained by approximating the images of the lane marks 6N at both ends of the road sections 5M.

Figure 6B:
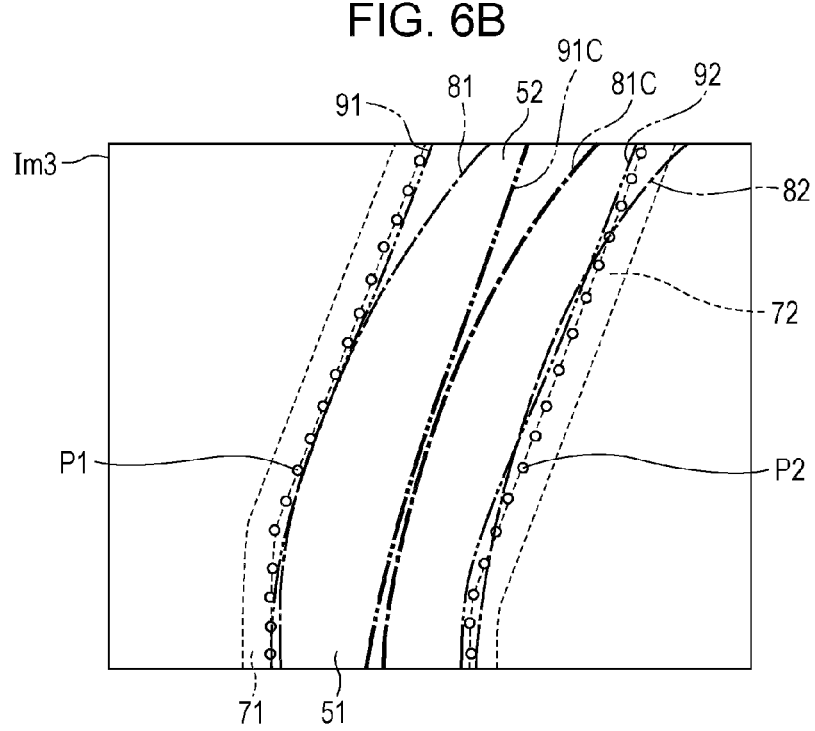
FIG. 6B illustrates first approximation lines and second approximation lines in the top view in which the edges of the road have been extracted.

In FIG. 6B, there is only one first center line 8LC, which is a first center line 81C obtained by approximating the shape of the curved road section 51 and the linear road section 52.

In step ST5, the controller 10 approximates the edge lines 7N by using the sampled approximation points PN (hereinafter, the approximation performed in step ST5 will be referred to as a "second approximation").

To be specific, the second approximation approximates the shape of the road section 5M along which the vehicle 1 is driving by using an approximation expression having a degree of three or higher (see alternate long and double short dash lines 9N in FIG. 6B (N=1 and 2). (Hereinafter, a line obtained by the second approximation will be referred to as a "second approximation line").

In the present embodiment, the second approximation is performed by using an approximation expression having a degree of three. The lower the degree of the approximation expression used to approximate the shape of the road section 5M, the lighter the calculation load for performing the approximation. Therefore, performing the second approximation by using an approximation expression having a degree of three has the following advantages: the shape of a transitional section between a curved road section and a linear road section can be approximated more accurately than in a case where the approximation is performed by using an approximation expression having a degree of two; and a change in the shape of the road section 5M can be approximated more rapidly than in a case where the approximation is performed by using an approximation expression having a degree higher than three.

Second approximation lines 91 and 92 are respectively obtained by using approximation points P1 and P2 extracted from images of the lane marks 61 and 62 at both ends (the left end right ends) of the curved road section 51 and the linear road section 52. The second approximation lines 91 and 92 are cubic curves (lines obtained by using an approximation expression having a degree of three).

The controller 10 basically recognizes an approximation line 9LC (hereinafter, referred to as a "second center line 9LC") (L=1) that passes through midpoints between the second approximation lines 9N (the second approximation line 91 at the left end and the second approximation line 92 at the right end), which have been obtained by approximating the images of the lane marks 6N at both ends of the road sections 5M.

In FIG. 6B, there is only one second center line 9LC, which is a second center line 91C obtained by approximating the shape of the curved road section 51 and the linear road section 52.

The operations of steps ST2 to ST5 are performed by the shape recognizer 12.

The second approximation is more easily influenced by disturbance than the first approximation, because the degree of an approximation expression used for the second approximation is higher than that of an approximation expression used for the first approximation. Therefore, in step ST5, the controller 10 determines that the reliability of the second approximation lines 9N is high if all of the following conditions 10-1 to 10-9 are satisfied.

Condition 10-1 is a condition that the distance between the vehicle and an approximation point PN that is farthest from the vehicle 1 is greater than or equal to a predetermined distance in each of the present control period and a control period immediately before the present control period. The predetermined distance for this condition is set, by performing an experiment or the like beforehand, at a value with which it can be determined whether or not an image of a point distanced from the vehicle 1 had been captured so that the second approximation can be accurately performed.

Condition 10-2 is a condition that, in each of the road sections 5M, the number of the approximation points PN used for obtaining each of the second approximation lines 9N is greater than or equal to a predetermined number. The predetermined number for this condition is set, by performing an experiment or the like beforehand, at a number with which the reliability of an approximation result obtained by using the second approximation lines can be ensured.

Condition 10-3 is a condition that, in a case where the approximation points PN of the lane marks 6N at both ends of the road section 5M along which the vehicle 1 is driving are not obtained in the present control period, such control periods in which the approximation point PN are not obtained have not continued more than a predetermined number of periods. The predetermined number of periods for the present condition is set, by performing an experiment or the like beforehand, at a number of periods that is approximately the same as the maximum number of periods with which the reliability of an approximation result obtained by using the second approximation lines can be ensured.

Condition 10-4 is a condition that the difference between the second approximation lines 9N (91 and 92 in FIG. 6B) and the approximation points PN (P1 and P2 in FIG. 6B) for the edge lines 7N corresponding to the second approximation lines 9N is less than a predetermined value, the second approximation lines 9N being obtained by approximating images of the lane marks 6N at both ends of the road section 5M along which the vehicle 1 is driving. The predetermined value for the present condition is set, by performing an experiment or the like beforehand, at a value with which it is not detected that the road is a transitional section from a curved road section to a linear road section in a case where the approximation result differs considerably from the actual road section 5M, that is, in a case where the reliability of the second approximation lines 9N is low. The term "difference" in this condition refers to, for example, the minimum distance between the approximation points PN and the second approximation lines 9N or the standard deviation of the minimum distances between the approximation points PN and the second approximation lines 9N.

Condition 10-5 is a condition that the difference between the length of a line connecting points, each being on the respective second approximation lines 9N and each being nearest to the vehicle 1 and the length of a line connecting points, each being on the respective first approximation lines 8N and each being nearest to the vehicle 1 is less than or equal to a predetermined value, the first and second approximation lines 8N and 9N being obtained by approximating images of the lane marks 6N at both ends of the road section 5M along which the vehicle 1 is driving. The predetermined value for the present condition is set, by performing an experiment or the like beforehand, at a value with which the reliability of the second approximation lines can be ensured.

Condition 10-6 is a condition that the difference between the length of a line connecting a first point on the first center line 8LC that is nearest to the vehicle 1 and a second point on the second center line 9LC that is nearest to the vehicle 1 is less than or equal to a predetermined value, the first and second center lines 8LC and 9LC being center lines of the road section 5M along which the vehicle 1 is driving. The predetermined value for the present condition is set, by performing an experiment or the like beforehand, at a value with which the reliability of the second approximation lines can be ensured.

Condition 10-7 is a condition that the curvature of each of the second approximation lines 9N at a point nearest to the vehicle 1 is less than or equal to a predetermined value, the second approximation lines 9N being obtained by approximating images of the lane marks 6N at both ends of the road section 5M along which the vehicle 1 is driving. The predetermined value for the present condition is set, by performing an experiment or the like beforehand, at a value with which an operation of recognizing the road section 5M by using the second approximation lines 9N can be prevented from being performed at a very tight turn at which it is difficult to control the steering apparatus 30 of the vehicle 1.

Condition 10-8 is a condition that the rate of change of the curvature of each of the second approximation lines 9N at a point nearest to the vehicle 1 (for example, the difference in the curvature between the present control period and the control period immediately before the present control period) is less than or equal to a predetermined value, the second approximation lines 9N being obtained by approximating the images of the lane marks 6N at both ends of the road section 5M along which the vehicle 1 is driving. The predetermined value for the present condition is set, by performing an experiment or the like beforehand, at a value with which an operation of recognizing the road section 5M by using the second approximation lines 9N can be prevented from being performed at a very tight turn at which it is difficult to control the steering apparatus 30 of the vehicle 1.

Condition 10-9 is a condition that the direction in which the curved road section represented by the second center line 9LC is curved is the same as the direction in which the curved road section represented by the first center line 8LC is curved (that is, the signs of the curvatures of the first and second approximation lines 8LC and 9LC at points that are nearest to the vehicle 1 are the same).

The second approximation, which is performed by using an approximation expression having a degree higher than that of the first approximation, can more accurately approximate the shape of the road section 5M than the first approximation. However, the second approximation is more easily influenced by disturbance than the first approximation. Therefore, the condition 10-9 is used to detect whether the second approximation is not influenced by disturbance in accordance with whether or not the directions of the curves obtained by the first and second approximations are the same. Thus, the controller can appropriately steer the vehicle by using the second approximation that is not considerably influenced by disturbance.

Conditions 10-1 to 10-9 described above are examples for the present embodiment. Different conditions may be used, provided that they enable detecting whether the reliability of the second approximation lines can be ensured.

In step ST6, the controller 10 determines whether or not the vehicle 1 is driving along a transitional section from a curved road section to a linear road section (that is, the end of the curved road section). The operation of step ST6 is performed by the determiner 14.

Step ST6 will be described in detail. On the basis of the first approximation lines 8N obtained in step ST4 and the second approximation lines 9N obtained in step ST5, the controller 10 determines whether or not the vehicle 1 is driving along a transitional section of the road sections 5M from a curved road section to a linear road section (that is, the end of the curved road section) in accordance with whether or not the curve detector 141 detects a curved road section, whether or not the curve-end detector 142 detects the end of the curved road section, and whether or not the verifier 143 makes an affirmative verification. If the verification by the verifier 143 is affirmative, the controller 10 makes an affirmative determination in step ST6 (that is, determines that the vehicle 1 is driving along a transitional section from a curved road section to a linear road section).

First, the curve detector 141 will be described. The curve detector 141 obtains the curvature (hereinafter, referred to as the "first curvature") at a predetermined point of the first center line 8LC (for example, a point nearest to the present vehicle). If the first curvature is less than a predetermined curvature, the curve detector 141 detects that the road section 5M along which the vehicle 1 is driving is a linear road section. If the first curvature is greater than or equal to the predetermined curvature, the curve detector 141 determines that the road section 5M along which the vehicle 1 is driving is a curved road section. The predetermined curvature is set, by performing an experiment or the like beforehand, at a curvature with which a curved road section can be accurately detected.

Next, the curve-end detector 142 will be described. The curve-end detector 142 detects that the road section 5M along which the vehicle 1 is driving is a transitional section from a curved road section to a linear road section if all of the following three conditions 142-1 to 142-3 are satisfied.

Condition 142-1 is a condition that "a state in which the curve detector 141 is detecting a curved road section" has continued for a predetermined number of periods or more. The predetermined number of periods for the present condition is set, by performing an experiment or the like beforehand, at a number of periods for which such a state is expected to continue when the vehicle 1 is driving along a curved road section.

Condition 142-2 is a condition that the first curvature in a control period immediately before the present control period is less than a predetermined value. The predetermined value for the present condition is set, by performing an experiment or the like beforehand, at a value with which a transitional section from a curved road section to a linear road section can be detected.

Condition 142-3 is a condition that none of the following three conditions 142-3-1 to 142-3-3 is satisfied.

Condition 142-3-1 is a condition that "a state in which the curve detector 141 is detecting a linear road section" has continued for a predetermined number of periods or more. The predetermined number of periods for the present condition is set, by performing an experiment or the like beforehand, at a number of periods for which such a state is expected to continue when the vehicle 1 is driving along a linear road section.

Condition 142-3-2 is a condition that the first curvature increases by a predetermined value or more in a predetermined control period. The predetermined control period and the predetermined value for the present condition are set, by performing an experiment or the like beforehand, at a period and a value with which it can be detected that the vehicle 1 is driving along a curved road section.

Condition 142-3-3 is a condition that the first curvature does not decrease to a predetermined value during a predetermined time after the conditions 142-1 and 142-2 are satisfied. The predetermined time and the predetermined value for the present condition are set, by performing an experiment or the like beforehand, at a time and a value with which it can be detected that the vehicle 1 is driving along a curved road section.

The conditions 142-1 to 142-3 and 142-3-1 to 142-3-3 described above are examples for the present embodiment. Different conditions may be used, provided that they enable detection that the road section 5M along which the vehicle 1 is driving is a transitional section from a curved road section to a linear road section.

Next, the verifier 143 will be described. The verifier 143 verifies that the road section 5M along which the vehicle 1 is driving is a transitional section from a curved road section to a linear road section if both of the following two conditions 143-1 and 143-2 are satisfied.

Condition 143-1 is a condition that "a state in which the curve-end detector 142 is detecting a transitional section from a curved road section to a linear road section" has continued for a predetermined number of periods or more. The predetermined number of periods for the present condition is set, by performing an experiment or the like beforehand, at a number of periods for which such a state is expected to continue when the road section 5M along which the vehicle 1 is driving is a curved road section.

Condition 143-2 is a condition that the minimum distance between the first approximation lines 8N (81 and 82 in FIG. 6B, because the present vehicle is driving along the curved road section 51) and the approximation points PN (P1 and P2 in FIG. 6B) for the edge lines 7N corresponding to the first approximation lines 8N is less than a predetermined value, the first approximation lines 8N being obtained by approximating images of the lane marks 6N at both ends of the road section 5M along which the vehicle 1 is driving. The predetermined value for the present condition is set, by performing an experiment or the like beforehand, at a value with which it is not detected that the road is a transitional section from a curved road section to a linear road section in a case where the approximation result differs considerably from the actual road section 5M, that is, in a case where the reliability of the first approximation lines 8N is low.

The conditions 143-1 and 143-2 described above are examples for the present embodiment. Different conditions may be used, provided that they enable verification that the road section 5M along which the vehicle 1 is driving is a transitional section from a curved road section to a linear road section.

On the basis of the verification by the verifier 143, the controller 10 determines in step ST6 that the road section 5M along which the vehicle 1 is driving is a transitional section from a curved road section to a linear road section.

Heretofore, the details of the operation of step ST6 have been described.

In the present embodiment, if it has been determined in step ST5 that the reliability of the second approximation lines 9N is low (if any of the conditions 10-1 to 10-9 is not satisfied), the controller 10 makes a negative determination in step ST6 without exception.

If the determination in step ST6 is affirmative, the process proceeds to step ST7, and the controller 10 recognizes the road section 5M on the basis of the second approximation lines 9N. To be specific, the controller 10 recognizes the second center line 9LC as the center line of the road section 5M along which the vehicle 1 is driving.

In step ST8, the controller 10 determines whether or not the approximation lines for recognizing the road section 5M were switched from the first approximation lines 8N to the second approximation lines 9N in the operation of step ST7.

If the controller 10 determines in step ST8 that the approximation lines were switched from the first approximation lines 8N to the second approximation lines 9N, the process proceeds to step ST9.

In step ST9, the controller 10 sets the transition period to a second time. In step ST10, the controller 10 determines the shape of the road section 5M that is used as a recognition result in the transition period.

The term "transition period" refers to a period for suppressing a sudden change that may occur two approximation lines having different shapes are suddenly switched. By gradually changing the shape of the approximation line in the transition period, steering of the vehicle can be gradually changed in accordance with the gradually changing shape of the road section 5M that is recognized.

To be specific, the controller 10 determines the position of an approximation line in the transition period by using the following equation (1), thereby gradually changing the position of the approximation line from "P_before", which is the position before being switched, to "P_after", which is the position after being switched.

$$P\_trans = \frac{t\_props}{t\_trans} \cdot (P\_after - P\_before) + P\_before \quad (1)$$

Here, P_trans is the position of the approximation line at the present time (present control period) in the transition period. t_prog is the time elapsed from the start of the transition period. t_trans is the time that is set as the transition period (which is set at the second time in step ST9 and is set at the first time in step ST13 described below).

In the transition period, until the set transition period elapses or the determination in ST6 changes, the shape of the road section 5M that is used as a recognition result in the transition period of the present control period is determined in step ST10.

The second time is set, by performing an experiment or the like beforehand, at a length with which steering of the vehicle can be gradually changed in a case where the approximation lines for recognizing the road section 5M are changed from the first approximation lines 8N to the second approximation lines 9N.

If the determination in step ST6 is negative, the process proceeds to step ST11, and the controller 10 recognizes the road section 5M on the basis of the first approximation lines 8N. To be specific, the controller 10 recognizes that the first center line 8LC of the road section 5M along which the vehicle 1 is driving is the center line of the road section 5M.

In step ST12, the controller 10 determines whether or not the approximation lines for recognizing the road section 5M were switched from the second approximation lines 9N to the first approximation lines 8N in the operation of step ST11.

If the controller 10 determines in step ST12 that the approximation lines were switched from the second approximation lines 9N to the first approximation lines 8N, the process proceeds to step ST13.

In step ST13, the controller 10 sets the transition period to a first time.

The first time is set, by performing an experiment or the like beforehand, at a length with which steering of the vehicle can be gradually changed in a case where the approximation lines for recognizing the road section 5M are changed from the second approximation lines 9N to the first approximation lines 8N.

The second time is set, by performing an experiment or the like beforehand, to be shorter than the first time. Thus, when the shape of the road section 5M changes considerably (when the determination in step ST6 is affirmative), that is, when it is necessary to accurately recognize the shape of the road section 5M, the shape of the road section 5M that is recognized can be rapidly changed from the first center line (first shape) 8LC to the second center line (second shape) 9LC. As a result, steering of the vehicle can be appropriately controlled.

After the controller 10 has finished the operation of step ST13, the process proceeds to step ST10 described above.

If the controller 10 has finished the operation of step ST10, determines in step ST8 that the approximation lines were not switched from the first approximation lines 8N to the second approximation lines 9N, or determines in step ST12 that the approximation lines were not switched from the second approximation lines 9N to the first approximation lines 8N, the process proceeds to step ST14.

In step ST14, the controller 10 performs an operation (lane keep assist operation) of activating the steering apparatus 30 so that the vehicle 1 drives along the approximation line (the first center line 8LC or the second center line 9LC) for recognizing the road section 5M, which has been set in step ST7 or ST11, or, in the transition period, so that the vehicle 1 drives along a road section set by using equation (1) in step ST10. Then, the controller 10 finishes the operations for one control period shown in FIG. 4.

The operation of step ST14 is performed by the steering control unit 13.

As described above, in step ST6, the controller 10 makes an affirmative determination if the vehicle 1 is driving along a transitional section from the curved road section 51 to the linear road section 52. If the determination in step ST6 is affirmative (that is, the vehicle is driving along a road whose shape changes considerably, such as a transitional section between a curved road section and a linear road section), the controller 10 recognizes the shape of the road section 5M on the basis of the second approximation lines 9N.

By using the second approximation, whose approximation performance is higher than that of the first approximation, the shape of a road can be approximated while suppressing decrease in the approximation accuracy. For example, FIG. 6B shows that the second center line 91C approximates the shapes of the curved road section 51 and the linear road section 52 more accurately than the first center line 81C does.

Accordingly, even when the vehicle is driving along a transitional section between a curved road section and a linear road section (in particular, when the vehicle is driving along a road that suddenly changes from a curved road section to a linear road section), the controller 10 can appropriately recognize the shape of a road and steer the vehicle.

For a steering controller, it is not preferable that the curvatures of the road section 5M that is recognized (hereinafter, referred to as the "approximation curvature") be greater than the actual curvature of the road section 5M (hereinafter, referred to as the "actual curvature").

This is because, if steering of the vehicle 1 was controlled by using an approximation line whose approximation curvature is greater than the actual curvature, the vehicle 1 would drive along a line that is curved more sharply than the actual road section 5M.

In a case where the road section 5M is approximated by using the first approximation, when the vehicle is driving along a curved road section, the shape of the curved road section is approximated by using the second approximation. In this case, when the actual curvature increases (for example, the road changes from a linear load section to a curved load section), the approximation curvature tends to be less than the actual curvature. When the actual curvature decreases (for example, when the road changes from a curved road section to a linear road section), the approximation curvature tends to be greater than the actual curvature.

Accordingly, in a transitional section from a curved road section to a linear road section, if the road section 5M is approximated by using the first approximation (an approximation using a quadratic curve), the vehicle 1 may drive along a line that is excessively curved with respect to the linear road section (see 81C in FIG. 6B).

Therefore, in a transitional section from a curved road section to a linear road section, the controller 10 can more accurately recognize the actual shape of the road section 5M by performing the second approximation (see 91C in FIG. 6B) than by performing the first approximation (see 81C in FIG. 6B). As a result, the probability that the vehicle moves along a line that is excessively curved with respect to the linear road section can be suppressed, and therefore the vehicle can be appropriately steered.

If the determination in step ST6 is negative, that is, when the vehicle 1 is driving along a road whose shape changes slightly, such as a linear road section or curved road section having a constant curvature, the controller 10 can approximate the shape of the road by performing the first approximation with a light calculation load while maintaining a required accuracy.

If the controller 10 determines that the reliability of the second approximation lines 9N is low in step ST5 (that is, if any of the conditions 10-1 to 10-9 is not satisfied), the controller 10 does not set a transition period and immediately controls steering of the vehicle 1 along a road (first center line 8LC) that is recognized on the basis of the first approximation lines 8N.

Figure 3:
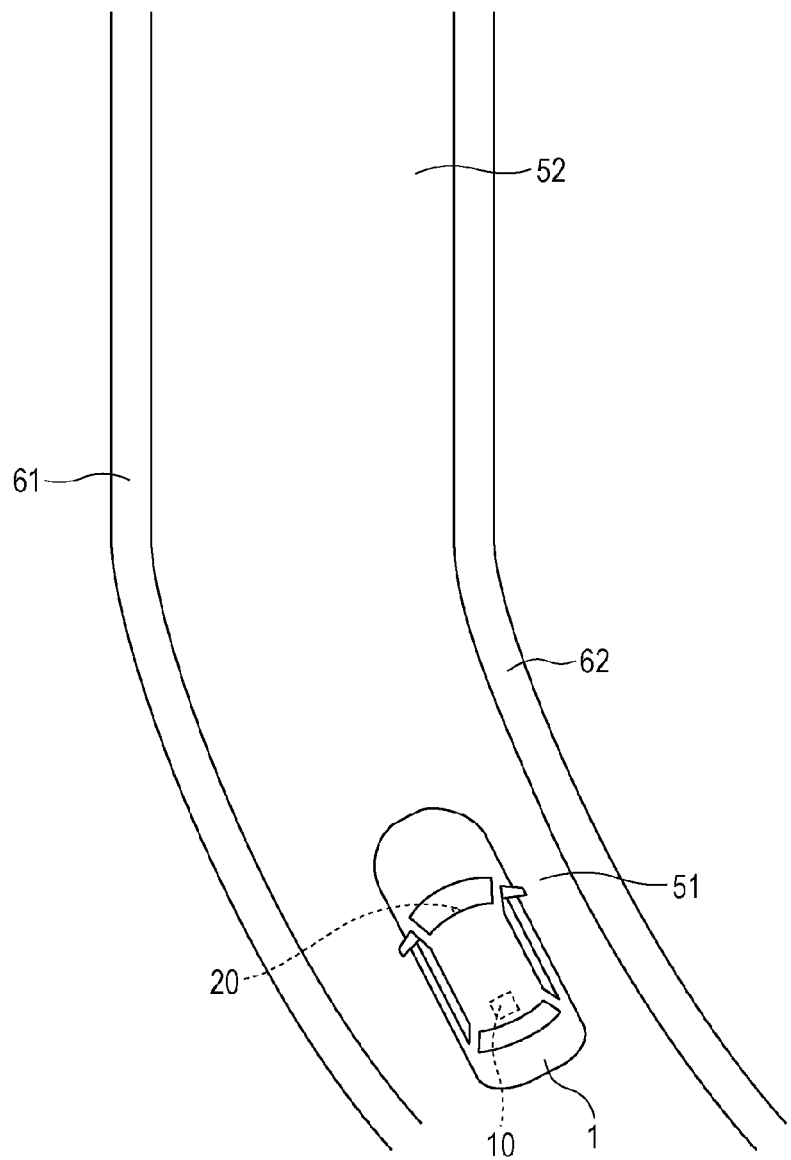
FIG. 3 illustrates the relationship between the vehicle and a road.
Figure 7:
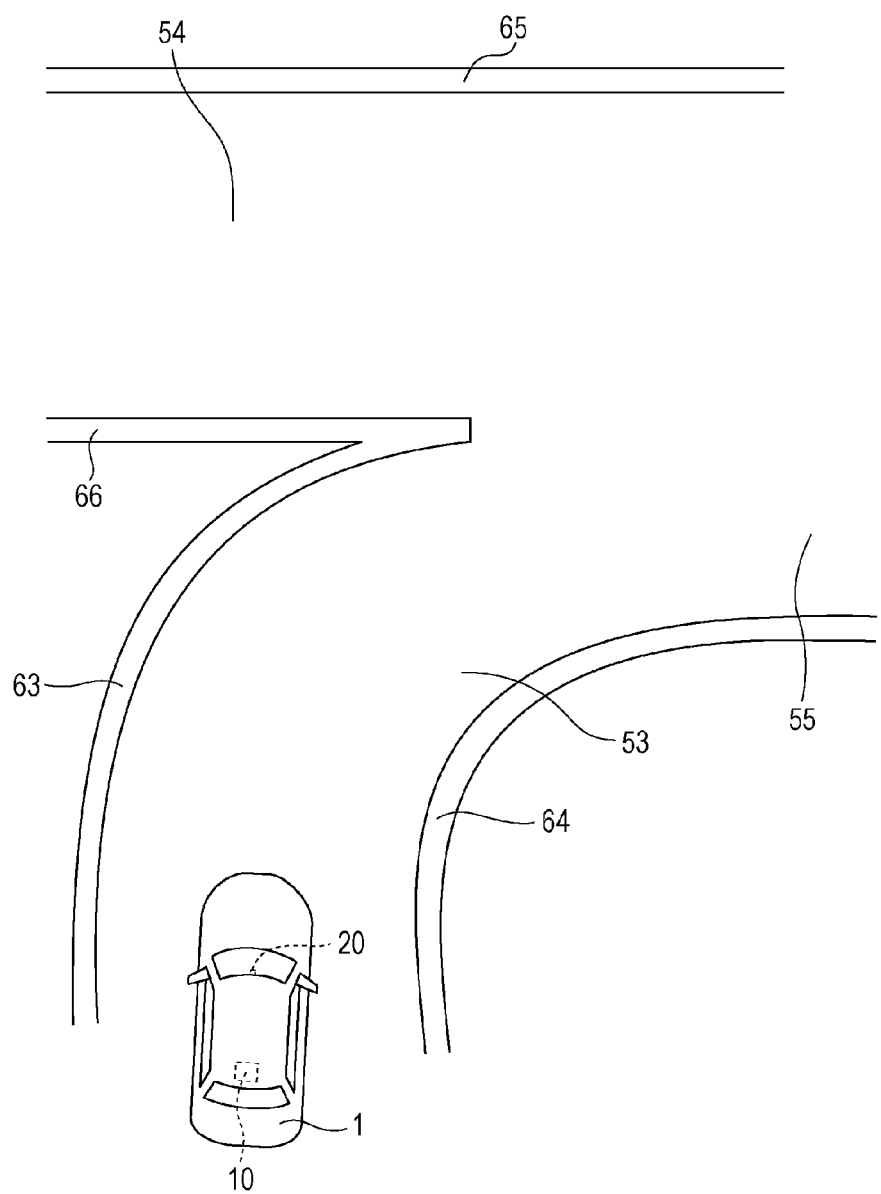
FIG. 7 illustrates the relationship between the vehicle and a road that is different from that of FIG. 3.

As described above, the steering controller according to the present disclosure has an advantage in that it can appropriately recognize the shape of a road and steer the vehicle not only when the vehicle is driving along the road illustrate in FIG. 3 but also when the vehicle is driving along, for example, a road illustrated in FIG. 7.

FIG. 7 illustrates a state of the vehicle 1 in which the vehicle 1 is driving from a road section 53 having a curved shape (hereinafter, referred to as a "curved road section 53"); through a merge lane 55, which is a road section having a linear shape (corresponding to a "linear road section" of the present disclosure); and to a through lane 54, which is a road section having a linear shape. (From the curved road section 53 to the merge lane 55, the curvature of the road along which the vehicle 1 is driving decreases.)

Figure 8A:
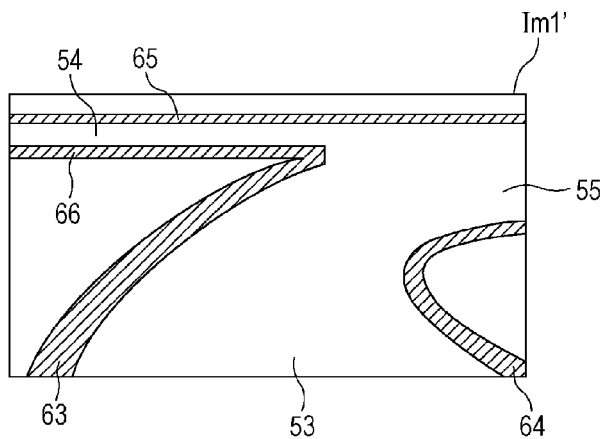
FIG. 8A illustrates an image captured by a camera in the state shown in FIG. 7.
Figure 8B:
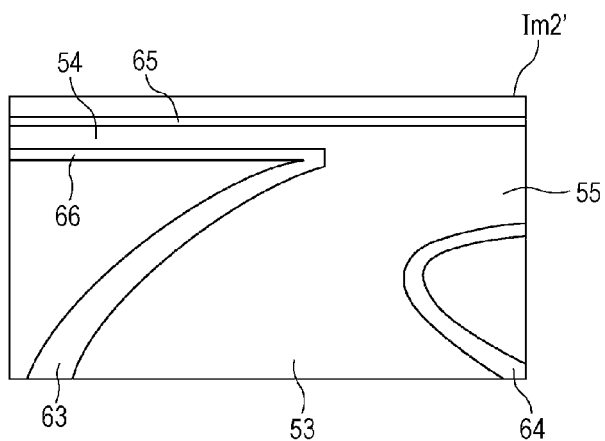
FIG. 8B illustrates edges extracted from the image of FIG. 8A.
Figure 8C:
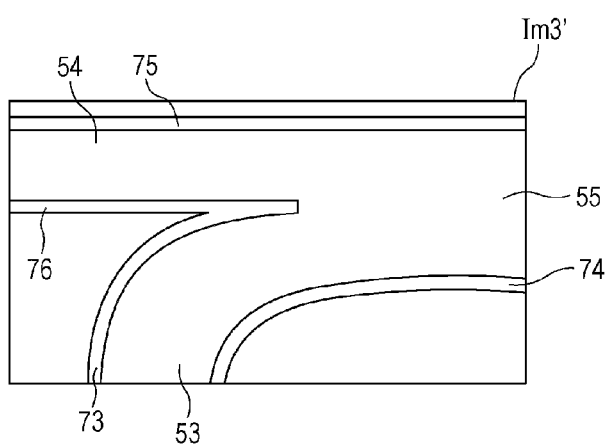
FIG. 8C is a top view of the image of FIG. 8B.

FIGS. 8A to 8C illustrate images obtained by performing the operations of steps ST2 and ST3 of FIG. 4 in the state shown in FIG. 7. The images in FIGS. 8A, 8B, and 8C respectively correspond to the images in FIGS. 5A, 5B, and 5C in the state shown in FIG. 3.

To be specific, in the state shown in FIG. 7, images (Im1' in FIG. 8A) of the road sections 5M (M=3 to 5) in front of the vehicle 1, which are captured by the camera 20, are input to the controller 10 (step ST1). The controller 10 detects lane marks 6N (N=3 to 6) of the road sections 5M (Im2' in FIG. 8B) on the basis of the captured images, extracts edge lines 7N (N=3 to 6), and generates a top-view image Im3' (FIG. 8C and the like) (steps ST2 and ST3).

Figure 9A:
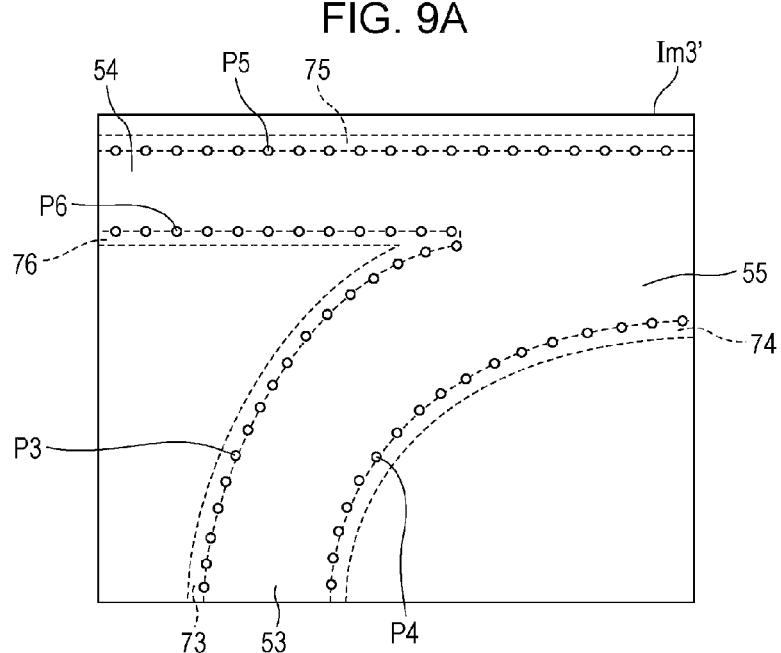
FIG. 9A illustrates approximation points in the top view in which the edges of the road have been extracted in the state shown in FIG. 7.

Then, the controller 10 samples approximation points PN (N=3 to 6) from the edge lines 7N in the top-view image Im3' (see FIG. 9A). Subsequently, in step ST4, the controller 10 performs a first approximation by using the approximation points PN and obtains first approximation lines 8N (N=3 to 6) (see FIG. 9B). First approximation lines 85 and 86 are obtained by using approximation points P5 and P6, which are extracted from images of lane marks 65 and 66 at both ends (the left and right end) of the through lane 54. The first approximation lines 85 and 86 are straight lines (lines obtained by using an approximation expression having a degree of one) or quadratic curves that are substantially linear (lines obtained by using an approximation expression having a degree of two and that have a small curvature at each point thereon).

First approximation lines 83 and 84 are obtained by using approximation points P3 and P4 extracted from images of lane marks 63 and 64 at both ends of the curved road section 53. The first approximation lines 83 and 84 are quadratic curves (lines obtained by using an approximation expression having a degree of two).

The controller 10 basically recognizes first center lines 8LC (L=2 and 3) that pass through midpoints between the first approximation lines 8N, which have been obtained by approximating the images of the lane marks 6N at both ends of the road sections 5M. (In the curved road section 53, the first approximation line 83 is at the left end, and the first approximation line 84 is at the right end. In the through lane 54, the first approximation line 85 is at the left end, and the first approximation line 86 is at the right end. In the merge lane 55, the first approximation line at the left end does not exist, and the first approximation line 84 at the right end is the same as that of the curved road section 53.)

Figure 9B:
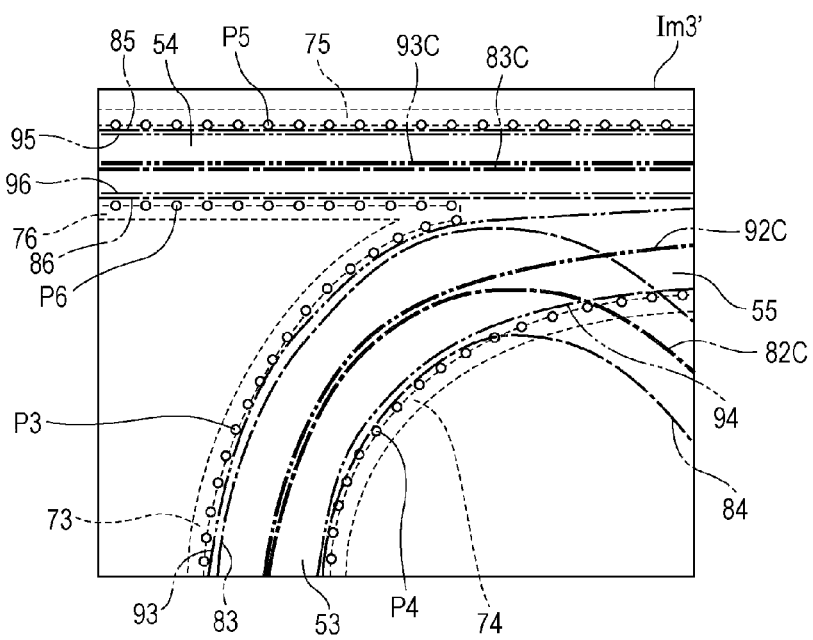
FIG. 9B illustrates first approximation lines and second approximation lines in the top view in which the edges of the road have been extracted.

In FIG. 9B, there are two first center lines 8LC. One is a first center line 82C, which is obtained by approximating the shapes of the curved road section 53 and the merge lane 55; and the other is a first center line 83C, which is obtained by approximating the shape of the through lane 54.

In step ST5, the controller 10 obtains the second approximation lines 9N (N=3 to 6) by performing a second approximation (see FIG. 9B) using the approximation points PN.

Second approximation lines 95 and 96 are respectively obtained by using approximation points P5 and P6 extracted from images of lane marks 65 and 66 at both ends of the through lane 54. The second approximation lines 95 and 96 are substantially straight lines (a line obtained by using an approximation expression having a degree of three) or cubic curves that are substantially straight lines (lines that are obtained by using an approximation expression having a degree of three and that have a small curvature at each point thereon).

Second approximation lines 93 and 94 are obtained by using approximation points P3 and P4 extracted from images of lane marks 63 and 64 at both ends of the curved road section 53. The second approximation lines 93 and 94 are cubic curves (lines obtained by using an approximation expression having a degree of three).

The controller 10 basically recognizes second center lines 9LC (L=2 and 3), which pass through midpoints between the second approximation lines 9N, which have been obtained by approximating the images of the lane marks 6N at both ends of the road sections 5M. (In the curved road section 53, the second approximation line 93 is at the left end, and the second approximation line 94 is at the right end. In the through lane 54, the second approximation line 95 is at the left end, and the second approximation line 96 is at the right end. In the merge lane 55, the second approximation line at the left end does not exist, and the second approximation line 94 at the right end is the same as that of the curved road section 53.)

There are two second center lines 9LC. One is a second center line 92C, which is obtained by approximating the shapes of the curved road section 53 and the merge lane 55; and the other is a second center line 93C, which is obtained by approximating the shape of the through lane 54.

In the state illustrated in FIG. 7, if the controller 10 makes an affirmative determination in step ST6 that the vehicle is driving along a transitional section from the curved road section 53 to the merge lane 55, which is a linear road section, the controller 10 recognizes the road section 5M on the basis of the second approximation lines 9N (steps ST7 to ST10, and ST14). Therefore, also in the state illustrated in FIG. 7, by using the second approximation, whose approximation performance is higher than that of the first approximation, the shape of a road can be approximated while suppressing decrease in the approximation accuracy. For example, FIG. 9B shows that the second center line 92C more appropriately approximates the shapes of the curved road section 53 and the merge lane 55 than the first center line 82C does. Accordingly, even when the vehicle is driving along the transitional section from the curved road section 51 to the merge lane 55, which is a linear road section, as illustrated in FIG. 7, the controller 10 can appropriately recognize the shape of the road and steer the vehicle 1.

In the foregoing description regarding the state illustrated in FIG. 7, the controller 10 performs the following operations: detecting the lane marks 6N (N=5 and 6) of the through lane 54; extracting the edge lines 7N (N=5 and 6); sampling the approximation points PN (N=5 and 6); obtaining the first approximation lines 8N (N=5 and 6) and the second approximation lines 9N (N=5 and 6) by performing the first approximation and the second approximation; and recognizing the first center line 8NC (N=3) and the second center line 9NC (N=3). However, this is not a limitation. In the state illustrated in FIG. 7, regarding the through lane 54, it is not necessary that the controller 10 perform all or some of the above operations from detecting the lane mark 6N (N=5, 6) to recognizing the first center line 8NC (N=3) and the second center line 9NC (N=3).

In the present embodiment, the controller 10 (to be specific, the determiner 14) determines whether or not the vehicle is driving along a transitional section from a curved road section to a linear road section in step ST6. However, this is not a limitation. Alternatively, in step ST6, the controller 10 may determine whether or not the vehicle is driving along a transitional section between a curved road section and a linear road section (that is, any of "a transitional section from a curved road section to a linear road section" and "a transitional section from a linear road section to a curved road section"). Also in this case, the shape of a road can be approximated by using the second approximation, whose approximation performance is higher than that of the first approximation, while suppressing decrease in the approximation accuracy. Accordingly, even when the vehicle is driving along a transitional section between a curved road section and a linear road section, the controller can appropriately recognize the shape of the road and steer the vehicle.

In the present embodiment, the second approximation is performed by using an approximation expression having a degree of three. However, the second approximation may be performed by using an approximation expression having a degree of three or higher.

In the present embodiment, the second time, which is set as a transition period, is shorter than the first time. However, this is not a limitation. The first time and the second time may be the same as each other, as long as the controller can appropriately recognize the shape of the road and steer the vehicle even in a case where the vehicle is driving along a transitional section between a curved road section and a linear road section.

In the present embodiment, a transition period is set and the approximation lines for recognizing the road are gradually switched between the first approximation lines 8N and the second approximation lines 9N in the transition period. However, the approximation lines for recognizing the road may be instantaneously switched without setting the transition period. Also in this case, an advantage of the present disclosure can be obtained that the controller can appropriately recognize the shape of a road and steer the vehicle even when the vehicle is driving along a transitional section between a curved road section and a linear road section.

In the present embodiment, the controller 10 does not use the second approximation lines 9N to recognize the road when the direction in which a curved road section is curved obtained by using the second approximation lines 9N is not the same as the direction in which a curved road section is curved obtained by using the first approximation lines 8N (when the condition 10-9 is not satisfied). However, this is not a limitation. As long as the reliability of the approximation of the road using the second approximation lines 9N can be ensured, the second approximation lines 9N may be used to recognize the road even when the direction in which a curved road section is curved obtained by using the second approximation lines 9N is not the same as the direction in which a curved road section is curved obtained by using the first approximation lines 8N.

In the present embodiment, the first approximation and the second approximation are performed after performing a projective transformation. Alternatively, the first approximation and the second approximation may be performed after extracting edges and sampling approximation points from edge lines. In this case, for example, the shape of the road is recognized by performing a projective transformation on the approximation curves of the edge lines. The present invention may be embodied in other specific forms without departing from its spirit or essential characteristics. The described embodiments are to be considered in all respects only as illustrative and not restrictive. The scope of the invention is, therefore, indicated by the accompanied claims rather than by the foregoing description. All changes which come within the meaning and range of equivalency of the claims are to be embraced within their scope.

We claim:

1. A vehicle steering controlling apparatus comprising:
  a camera that captures an image of a view in a direction in which a vehicle is driving;
  a shape recognizer configured to recognize a shape of a road along which the vehicle is driving by performing a first approximation that is an approximation using a monomial or a polynomial having a degree of one or two, using the image captured by the camera;
  a steering controller configured to control steering of the vehicle on the basis of the shape of the road recognized by the shape recognizer; and a determiner configured to make a determination whether or not the shape of the road recognized by the shape recognizer is that of a transitional section between a curved road and a linear road, wherein, in a case where the determination made by the determiner is affirmative, the shape recognizer recognizes the shape of the road by performing a second approximation that is an approximation using a monomial or a polynomial having a degree of three or higher.

2. The vehicle steering controlling apparatus according to claim 1, wherein the second approximation is an approximation using a monomial or a polynomial having a degree of three.

3. The vehicle steering controlling apparatus according to claim 1, wherein the determiner makes an affirmative determination when the shape of the road recognized by the shape recognizer in the direction in which the vehicle is driving is that of a transitional section from a curved road to a linear road.

4. The vehicle steering controlling apparatus according to claim 1, wherein the shape recognizer recognizes the shape of the road as a first shape by performing the first approximation, and recognizes the shape of the road as a second shape by performing the second approximation, wherein the shape recognizer switches the shape of the road that is used as a recognition result between the first shape and the second shape in accordance with the determination made by the determiner, and wherein the shape recognizer provides a transition period in the switching to gradually change the shape of the road that is used as the recognition result in the transition period.

5. The vehicle steering controlling apparatus according to claim 4, wherein, in a case where the determination made by the determiner changes from negative to affirmative, the shape recognizer gradually changes the shape of the road that is used as the recognition result from the first shape before the change in the determination to the second shape in the transition period, wherein, in a case where the determination made by the determiner changes from affirmative to negative, the shape recognizer gradually changes the shape of the road that is used as the recognition result from the second shape before the change in the determination to the first shape in the transition period, and wherein the transition period in which the shape is switched from the first shape to the second shape is set to be shorter than the transition period in which the shape is switched from the second shape to the first shape.

6. The vehicle steering controlling apparatus according to claim 1, wherein, in a case where the determination made by the determiner is affirmative, the shape recognizer determines if a direction in which a curved portion of the shape of the road recognized by performing the second approximation is curved is the same as a direction in which a curved portion of the shape of the road recognized by performing the first approximation is curved, then uses the shape of the road recognized by performing the second approximation as a recognition result.

7. A vehicle steering controlling method comprising:

acquiring an image of a view in a direction in which a vehicle is driving;

recognizing, by using a computer, a shape of a road along which the vehicle is driving by performing a first approximation that is an approximation using a monomial or a polynomial having a degree of one or two, using the captured image;

making a determination, by using the computer, whether or not the shape of the road recognized by the shape recognizer is that of a transitional section between a curved road and a linear road, in a case where the determination is affirmative, recognizing, by using a computer, the shape of the road by performing a second approximation that is an approximation using a monomial or a polynomial having a degree of three or higher; and controlling steering of the vehicle on the basis of the shape of the recognized road.

8. A non-transitory computer-readable storage medium with an executable program stored thereon, wherein the program instructs a computer to perform steps comprising:

acquiring an image of a view in a direction in which a vehicle is driving;

recognizing a shape of a road along which the vehicle is driving by performing a first approximation that is an approximation using a monomial or a polynomial having a degree of one or two, using the captured image;

making a determination whether or not the shape of the road recognized by the shape recognizer is that of a transitional section between a curved road and a linear road, in a case where the determination is affirmative, recognizing the shape of the road by performing a second approximation that is an approximation using a monomial or a polynomial having a degree of three or higher; and controlling steering of the vehicle on the basis of the shape of the recognized road.

* * * * *